United States Patent
Choi et al.

(10) Patent No.: US 9,538,552 B2
(45) Date of Patent: Jan. 3, 2017

(54) METHOD AND APPARATUS FOR TRANSCEIVING BEACON IN WIRELESS LAN SYSTEM

(71) Applicant: LG Electronics Inc., Seoul (KR)

(72) Inventors: Jinsoo Choi, Anyang-si (KR);
Seunghee Han, Anyang-si (KR);
Jinsam Kwak, Anyang-si (KR);
Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/389,581

(22) PCT Filed: Apr. 1, 2013

(86) PCT No.: PCT/KR2013/002684
§ 371 (c)(1),
(2) Date: Sep. 30, 2014

(87) PCT Pub. No.: WO2013/147563
PCT Pub. Date: Oct. 3, 2013

(65) Prior Publication Data
US 2015/0078229 A1    Mar. 19, 2015

Related U.S. Application Data

(60) Provisional application No. 61/617,667, filed on Mar. 30, 2012.

(51) Int. Cl.
*H04W 74/00* (2009.01)
*H04W 56/00* (2009.01)
(Continued)

(52) U.S. Cl.
CPC ....... *H04W 74/002* (2013.01); *H04W 52/0216* (2013.01); *H04W 52/0241* (2013.01);
(Continued)

(58) Field of Classification Search
CPC ............... H04W 52/0216; H04W 52/0241; H04W 56/001; H04W 74/002; H04W 76/048; H04W 84/12
(Continued)

(56) References Cited

U.S. PATENT DOCUMENTS 9,226,233 B2 * 12/2015 Liu .................. H04W 52/0216
2005/0128988 A1 * 6/2005 Simpson ............... H04W 48/16
370/338
(Continued)

FOREIGN PATENT DOCUMENTS

CN         1947443 A      4/2007
CN       101044768 A      9/2007
(Continued)

OTHER PUBLICATIONS

Merlin, Simone et al., "Short beacon", IEEE 802.11-12/0129rl, TGah, Jan. 17, 2012.
(Continued)

*Primary Examiner* — Chi H Pham
*Assistant Examiner* — Robert Lopata
(74) *Attorney, Agent, or Firm* — Dentons US LLP

(57) ABSTRACT

The present invention relates to a wireless communication system, and more specifically discloses a method and an apparatus for transceiving a beacon in a wireless LAN system. A method for receiving a beacon from a station (STA) in a wireless communication system according to one embodiment of the present invention comprises the steps of: receiving a probe response frame from an access point (AP); determining the time at which the next beacon is to be received by means of information regarding the next beacon contained in the probe response frame; and receiving the next beacon at the time determined for receiving the next beacon.

13 Claims, 21 Drawing Sheets

(51) Int. Cl.
*H04W 52/02* (2009.01)
*H04W 84/12* (2009.01)
*H04W 76/04* (2009.01)

(52) U.S. Cl.
CPC ........ *H04W 56/001* (2013.01); *H04W 76/048* (2013.01); *H04W 84/12* (2013.01)

(58) Field of Classification Search
USPC .......................................................... 370/311
See application file for complete search history.

(56) References Cited

U.S. PATENT DOCUMENTS

| | | |
|---|---|---|
| 2005/0259754 A1 | 11/2005 | Ho et al. |
| 2006/0009246 A1 | 1/2006 | Marinier et al. |
| 2007/0042716 A1* | 2/2007 | Goodall ................ H04W 16/18 455/67.11 |
| 2007/0064671 A1 | 3/2007 | Kim et al. |
| 2008/0298333 A1 | 12/2008 | Seok |
| 2009/0141629 A1 | 6/2009 | Gerosa et al. |
| 2012/0263086 A1* | 10/2012 | Liu .................... H04W 52/0216 370/311 |
| 2013/0230028 A1* | 9/2013 | Calcev ............. H04W 72/1231 370/336 |
| 2014/0192713 A1* | 7/2014 | Park ..................... H04B 7/2656 370/328 |

FOREIGN PATENT DOCUMENTS

| | | |
|---|---|---|
| KR | 1020060034255 A | 4/2006 |
| KR | 1020060050081 A | 5/2006 |
| KR | 20070028213 A | 3/2007 |
| RU | 2008133596 A | 2/2010 |
| WO | 2007086705 A1 | 8/2007 |
| WO | 2009058906 A2 | 5/2009 |
| WO | 2009065144 A1 | 5/2009 |
| WO | 2009134288 A1 | 11/2009 |
| WO | 2010100322 A1 | 9/2010 |

OTHER PUBLICATIONS

Merlin, Simone et al., "Short beacon", IEEE 802.11-11/1503r1, TGah, Nov. 9, 2011.

* cited by examiner

FIG. 7
(a) 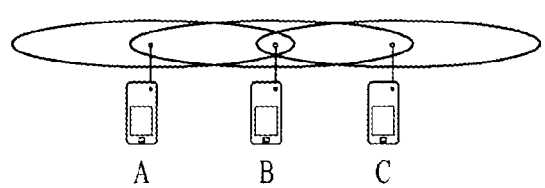
(b) 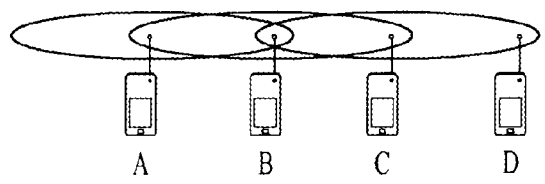

FIG. 15

| FC | SA | Compressed SSID | Timestamp | Change Sequence | Duration to Next Full Beacon | Optional IEs | CRC |
|---|---|---|---|---|---|---|---|
| 2 | 6 | TBD | 4 | 4 | TBD | VAR | 4 |

Octets

METHOD AND APPARATUS FOR TRANSCEIVING BEACON IN WIRELESS LAN SYSTEM This Application is a 35 U.S.C. §371 National Stage entry of International Application No. PCT/KR2013/002684, filed Apr. 1, 2013, which claims benefit of Provisional Application No. 61/617,667, filed Mar. 30, 2012, of which are incorporated by reference in their entirety herein.

TECHNICAL FIELD

The following descriptions relate to a wireless communication system and, more specifically, to a method and an apparatus for transmitting/receiving a beacon in a wireless LAN system.

BACKGROUND ART

With the growth of information communication technology, various wireless communication technologies are under development. Among the wireless communication technologies, wireless local area network (WLAN) technology enables wireless Internet access at home or in offices or specific service provision areas using a mobile terminal such as a personal digital assistant (PDA), a laptop computer, a portable multimedia player (PMP) or the like on the basis of radio frequency technology.

To overcome the communication rate limitations, which have been pointed out as a weak point of WLAN, recent technical standards have introduced systems with increased network rate and reliability and extended wireless network coverage. For example, IEEE 802.11n supports high throughput (HT) of a data rate of 540 Mbps or higher and introduces MIMO (Multiple Input Multiple Output) technology which uses multiple antennas for both a transmitter and a receiver in order to minimize transmission errors and optimize data rate.

DISCLOSURE

Technical Problem

M2M (Machine-to-Machine) communication technology is under discussion as next-generation communication technology. In IEEE 802.11 WLAN, IEEE 802.11ah is developed as a technical standard for supporting M2M communication. For M2M communication, a scenario in which a small amount of data is transmitted/received at a low speed occasionally in an environment having a considerably large number of devices can be considered.

Communication in a WLAN system is performed through a medium shared by all devices. When the number of devices increases as in M2M communication, channel access of one device takes a long time, deteriorating system performance and impeding power saving of devices.

An object of the present invention is to provide a new mechanism for transmitting/receiving a beacon frame.

The technical problems solved by the present invention are not limited to the above technical problems and those skilled in the art may understand other technical problems from the following description.

Technical Solution

The object of the present invention can be achieved by providing a method for receiving a beacon by a station (STA) in a wireless communication system, including: receiving a probe response frame from an access point (AP); determining a next beacon reception time using information on the next beacon time of the AP included in the probe response frame; and receiving the next beacon at the determined next beacon reception time.

In another aspect of the present invention, provided herein is a station (STA) for receiving a beacon in a wireless communication system, including: a transceiver; and a processor, wherein the processor is configured to receive a probe response frame from an access point (AP) using the transceiver, to determine a next beacon reception time using information on the next beacon time of the AP included in the probe response frame, and to receive the next beacon at the determined next beacon reception time using the transceiver.

The following is commonly applicable to the aforementioned embodiments of the present invention.

The STA may switch to a doze state after the determining of the next beacon reception time, and switches to an awake state before the next beacon reception time.

The next beacon may be a full beacon and the information on the next beacon time may be a duration to the next full beacon or next target beacon transmission time (TBTT).

The next beacon may be a short beacon and the information on the next beacon time may be a duration to the next short beacon.

The method may further include: determining a next full beacon reception time using a duration to the next full beacon or next TBTT included in the received short beacon; and receiving the next full beacon at the determined next full beacon reception time.

The STA may switch to a doze state after determining the next full beacon reception time, and switches to an awake state before the determined reception time.

The method may further include: determining the next full beacon reception time using at least one of short beacon count information or short beacon interval information; and receiving the next full beacon at the determined next full beacon reception time.

The at least one of the short beacon count information or the short beacon interval information may be included in the probe response frame or the short beacon.

The method may further include: determining the next full beacon reception time using at least one of short beacon number information, short beacon interval information, or short beacon index information; and receiving the next full beacon at the determined next full beacon reception time.

The at least one of short beacon number information, short beacon interval information, or short beacon index information may be included in the probe response frame or the short beacon.

The short beacon may further include at least one of a compressed service set identifier (SSID) field, a 4-byte timestamp, or a change sequence field.

The probe response frame may include at least one of a timestamp or an SSID.

The probe response frame may be received in response to a probe request frame transmitted from the STA to the AP.

The above description and the following detailed description of the present invention are exemplary and are for additional explanation of the invention disclosed in the claims.

Advantageous Effects

According to the present invention, it is possible to provide a new method and apparatus for transmitting/receiving a beacon frame.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 7 illustrates a hidden node and an exposed node;

FIG. 15 illustrates exemplary fields included in a short beacon frame;

BEST MODE

Figure 1:
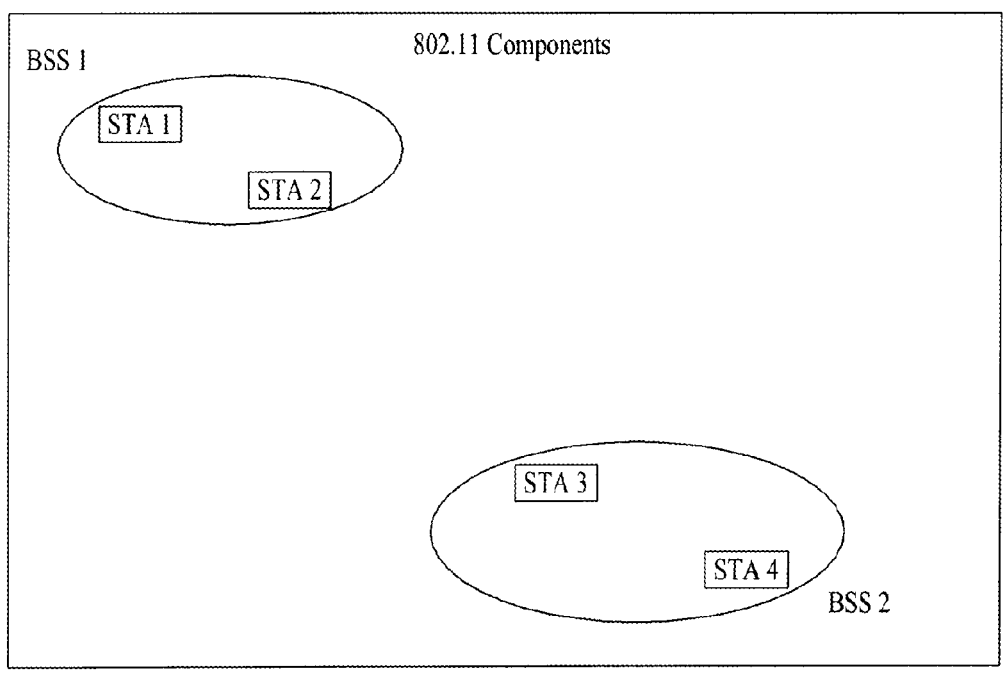
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

Configuration of WLAN System

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
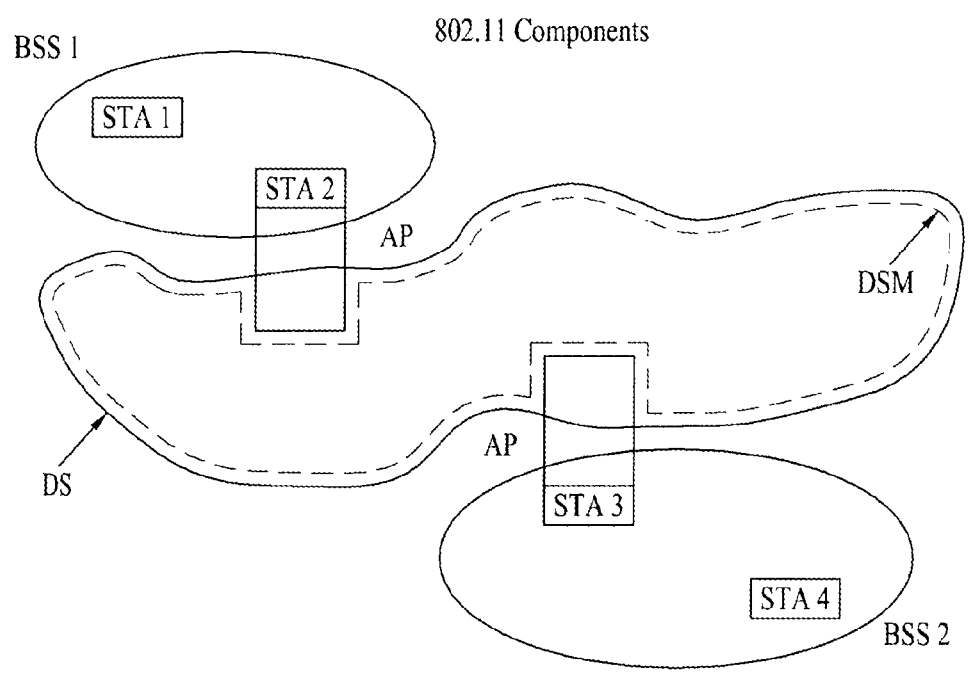
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
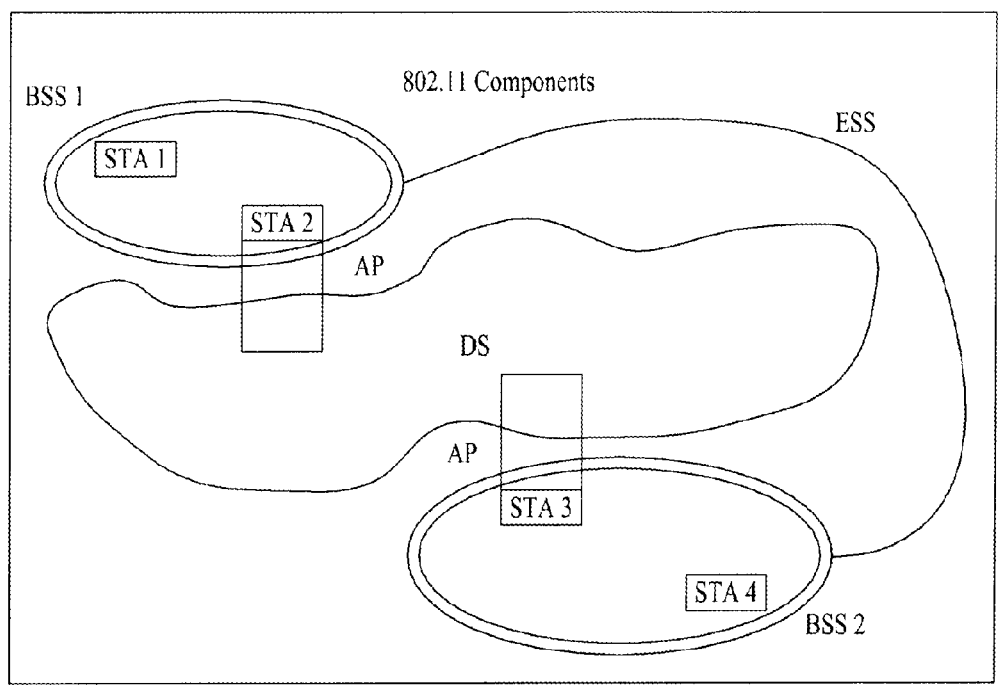
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
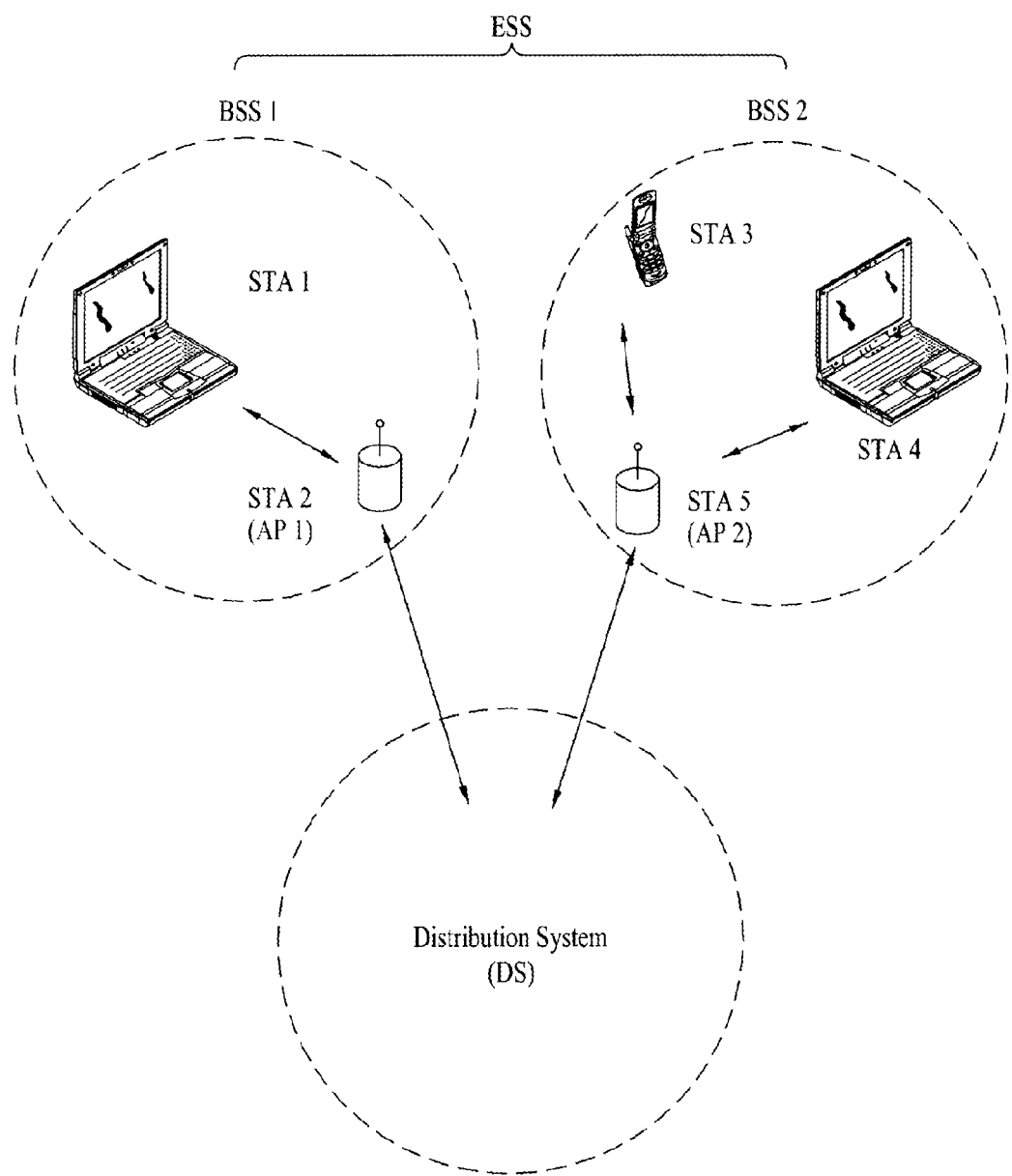
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc. in other wireless communication fields.

Link Setup Procedure

Figure 5:
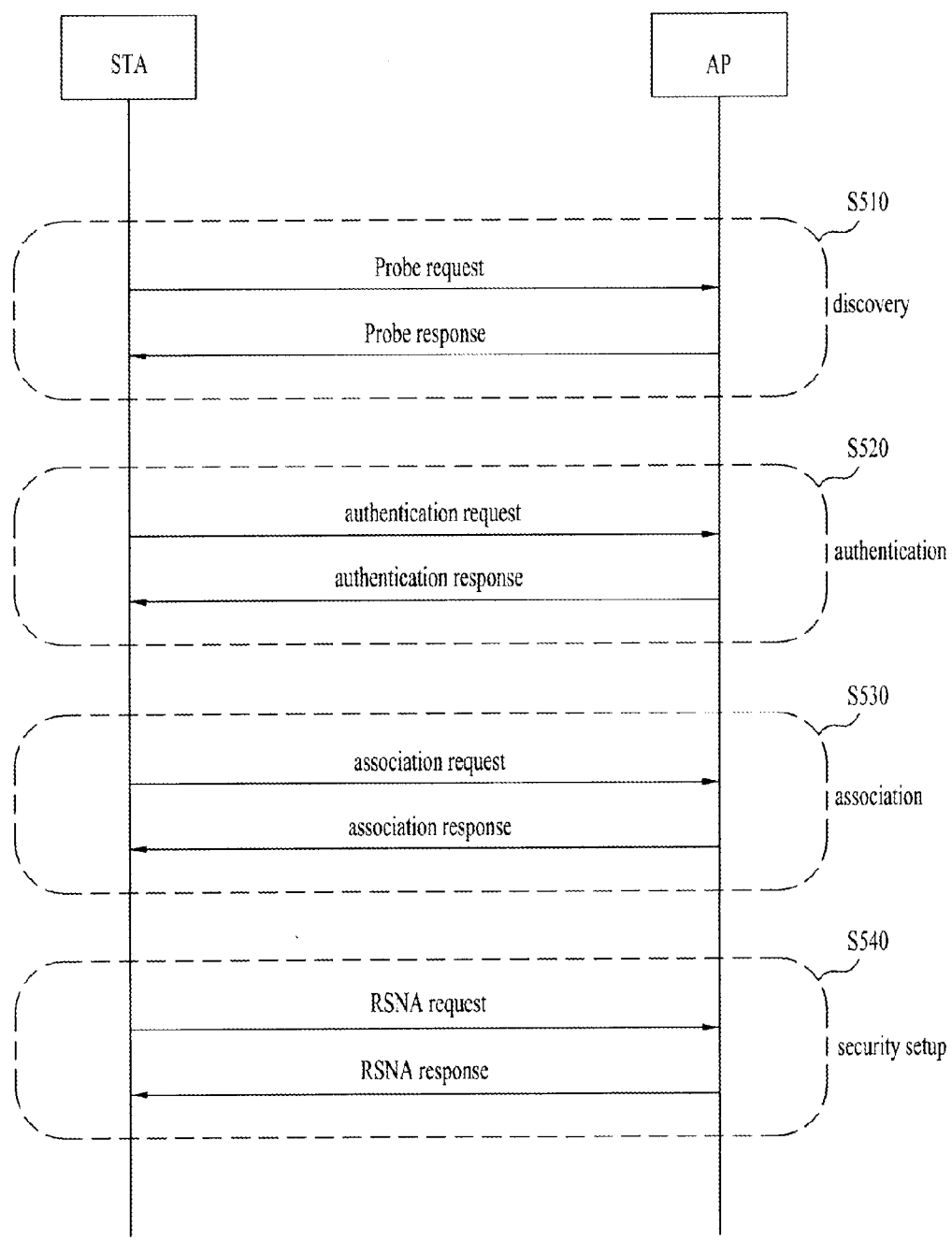
FIG. 5 illustrates a link setup procedure in a WLAN system.

FIG. 5 illustrates a general link setup procedure.

To sets up a link to a network and transmit/receive data, an STA needs to discover the network, perform authentication, establish association and pass through an authentication procedure for security. The link setup procedure may be called a session initiation procedure and a session setup procedure. In addition, discovery, authentication, association and security establishment of the link setup procedure may be called an association procedure.

An exemplary link setup procedure will now be described with reference to FIG. 5.

The STA may discover a network in step S510. Network discovery may include a scanning operation of the STA. That is, the STA needs to discover a network that can participate in communication in order to access the network. The STA needs to identify a compatible network prior to participating in a wireless network. A procedure of identifying a network present in a specific area is referred to as scanning.

Scanning includes active scanning and passive scanning.

FIG. 5 illustrates network discovery operation including active scanning. The STA performing active scanning transmits a probe request frame in order to search surrounding APs while changing channels and waits for a response to the probe request frame. A responder transmits a probe response frame in response to the probe request frame to the STA. Here, the responder may be an STA that has finally transmitted a beacon frame in a BSS of a channel being scanned. An AP corresponds to a responder in a BSS since the AP transmits a beacon frame, whereas a responder is not fixed in an IBSS since STAs in the IBSS transmit a beacon frame in rotation. For example, an STA, which has transmitted a probe request frame on channel #1, and has received a probe response frame on channel #1, may store BSS related information included in the received probe response frame, move to the next channel (e.g. channel #2) and perform scanning (i.e. probe request/response transmission and reception on channel #2) in the same manner.

The scanning operation may be performed in a passive scanning manner, which is not shown in FIG. 5. An STA performing passive scanning waits for a beacon frame while changing channels. The beacon frame, one of management frames in IEEE 802.11, indicates presence of a wireless network and is periodically transmitted to the STA performing scanning to enable the STA to discover and participate in the wireless network. An AP periodically transmits the beacon frame in the BSS, whereas STAs in the IBSS transmit the beacon frame in rotation in the case of IBSS. Upon reception of the beacon frame, the STA performing scanning stores information about the BSS, included in the beacon frame, and records beacon frame information in each channel while moving to another channel. The STA that has received the beacon frame may store BSS related information included in the received beacon frame, move to the next channel and perform scanning on the next channel through same method.

Comparing active scanning with passive scanning, active scanning has advantages of smaller delay and lower power consumption than passive scanning.

Upon discovery of the network, authentication may be performed on the STA in step S520. This authentication procedure may be referred to as first authentication to be discriminated from security setup operation of step S540, which will be described later.

Authentication includes a procedure through which the STA transmits an authentication request frame to the AP and a procedure through which the AP transmits an authentication response frame to the STA in response to the authentication request frame. An authentication frame used for authentication request/response corresponds to a management frame.

The authentication frame may include information about an authentication algorithm number, authentication transaction sequence number, status code, challenge text, RSN (Robust Security Network), finite cyclic group and the like. This information is an example of information that can be included in the authentication request/response frame and may be replaced by other information or include additional information.

The STA may transmit an authentication request frame to the AP. The AP may determine whether to permit authentication of the STA on the basis of information included in the received authentication request frame. The AP may provide an authentication processing result to the STA through an authentication response frame.

Upon successful authentication of the STA, association may be performed in step S530. Association includes a procedure through which the STA transmits an association request frame to the AP and a procedure through which the AP transmits an association response frame to the STA in response to the association request frame.

For example, the association request frame may include information related to various capabilities and information about a beacon listen interval, SSID (service set identifier), supported rates, supported channels, RSN, mobility domain, supported operating classes, traffic indication map (TIM) broadcast request, interworking service capability, etc.

For example, the association response frame may include information related to various capabilities and information about a status code, AID (association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameter, TIM broadcast response, QoS map, etc.

The aforementioned information is an example of information that can be included in the association request/response frame and may be replaced by other information or include additional information.

Upon successful association of the STA with a network, the security setup procedure may be performed in step S540. The security setup procedure S540 may correspond to authentication through RSNA (Robust Security Network Association) request/response, a first authentication procedure of the authentication procedure S520 or an authentication procedure.

The security setup procedure S540 may include a private key setup procedure through 4-way handshaking using an EAPOL (Extensible Authentication Protocol over LAN) frame. In addition, the security setup procedure may be performed according to a security scheme which is not defined in IEEE 802.11, standards.

Evolution of WLAN

IEEE 802.11n has been recently established as a technical standard for overcoming limitations on communication speed in a WLAN. IEEE 802.11n aims to increase network rate and reliability and to extend coverage of a wireless network. More specifically, IEEE 802.11n supports high throughput (HT) of data throughput of 540 Mbps or higher and is based on MIMO (Multiple Inputs and Multiple Outputs) using multiple antennas for both a transmitter and a receiver to optimize data rate while minimizing transmission error.

With propagation of WLAN and diversification of applications using the WLAN, there is a need for a new WLAN system for supporting higher throughput than data throughput supported by IEEE 802.11n. A next-generation WLAN system supporting very high throughput (VHT) corresponds to the next version (e.g. IEEE 802.11ac) of IEEE 802.11n and is one of newly suggested IEEE 802.11 WLAN systems in which a MAC service access point (SAP) supports data throughput of 1 Gbps or higher.

To efficiently use radio channels, next-generation WLAN systems support MU-MIMO (Multiple User MIMO) in which a plurality of stations (STAs) simultaneously accesses channels. According to MU-MIMO, an AP can simultaneously transmit packets to one or more MIMO-paired STAs.

Furthermore, support for WLAN operation in a whitespace is under discussion. For example, introduction of a WLAN system in a TV whitespace (TV WS) such as an idle frequency band (e.g. 54 to 698 MHz) caused by digitalization of analog TV is discussed in IEEE 802.11af. The whitespace is a band permitted to be preferentially used by a licensed user. A licensed user refers to a user permitted to use a licensed band and may be referred to as a licensed device, a primary user, an incumbent user or the like.

An AP and/or an STA operating in a WS need to provide protection of licensed users. For example, when a licensed user such as a microphone is using a specific WS channel corresponding to a frequency band having a specific bandwidth in a WS band, the AP and/or STA must not use the frequency band corresponding to the WS channel in order to protect the licensed user. In addition, when a licensed user uses a frequency band for current frame transmission and/or reception, the AP and/or STA need to stop using the frequency band.

Accordingly, the AP and/or STA need to preferentially check whether a specific frequency band in a WS band can be used, that is, whether a licensed user using the frequency band is present. Checking whether a licensed user corresponding to a specific frequency band is present is referred to as spectrum sensing. Energy detection, signature detection and the like are used as spectrum sensing mechanisms. When received signal strength exceeds a predetermined value, it may be determined that the licensed user is using the specific frequency band. Otherwise, when a DTV preamble is detected, it may be determined that the licensed user is using the frequency band.

M2M (Machine-to-Machine) communication technology is discussed as a next-generation communication technology. In IEEE 802.11, WLAN, IEEE 802.11ah is developed as a technical standard for M2M communication. M2M communication refers to a communication scheme including one or more machines and may be referred to as MTC (Machine Type Communication). Here, a machine means an entity that does not require direct manipulation or intervention of a person. For example, examples of the machine may include a device such as a meter or a vending machine equipped with a wireless communication module and user equipment such as a smartphone capable of automatically accessing a network and performing communication without user manipulation/intervention. M2M communication may include device-to-device (D2D) communication, communication between a device and an application server and the like. Examples of communication between a device and an application server may include communication between a vending machine and a server, between a point of sale (POS) device and a server and between electricity, gas or water meters and a server. In addition, M2M based applications may include security, transportation, healthcare and the like. Considering characteristics of applications of M2M communication, M2M may need to support transmission and reception of a small amount of data at a low speed occasionally in an environment in which a very large number of devices is present.

Specifically, M2M communication needs to support a large number of STAs. While it is assumed that one AP is associated with a maximum of 2007 STAs in the current WLAN system, methods for supporting a case in which a larger number of STAs (e.g. 6000 STAs) are associated with one AP are under discussion for M2M communication. Furthermore, it is expected that many applications support/require low transmission speed in M2M communication. To support this, methods for reducing a bitmap size of a traffic indication map (TIM) are discussed since an STA recognizes data to be transmitted thereto on the basis of a TIM element in a WLAN system. In addition, a large amount of traffic having very long transmission/reception intervals is expected in M2M communication. For example, in the case of electricity/gas/water metering, it is necessary to very infrequently (e.g. once a month) transmit/receive a very small amount of data. Accordingly, methods for efficiently supporting a case in which the number of STAs having data frames to be received from an AP during one beacon interval is very small even though the number of STAs that can be associated with the AP is very large are discussed in WLAN systems.

As described above, WLAN technology is rapidly evolving and technologies for establishing direct link setup, improving media streaming performance, supporting high-speed and/or large-scale initial session setup, extended bandwidths and operating frequencies, etc. are under development in addition to the aforementioned examples.

Medium Access Mechanism

In a WLAN system conforming to IEEE 802.11 a basic access mechanism of MAC (Medium Access Control) is a CSMA/CA (Carrier Sense Multiple Access with Collision Avoidance) mechanism. The CSMA/CA mechanism is referred to as a distributed coordination function (DCF) of IEEE 802.11 MAC and basically employs a "listen before talk" access mechanism. According to this type of access mechanism, an AP and/or an STA can perform CCA (Clear Channel Assessment) for sensing a radio channel or medium for a predetermined period (e.g. DIFS (DCF Inter-Frame Space)) prior to transmission. Upon determining that the medium is in an idle state as a sensing result, the AP and/or STA starts frame transmission through the medium. Upon detecting that the medium is in an occupied state, the AP and/or STA may set a delay (e.g. a random backoff period) for medium access, wait and then attempt frame transmission rather than starting transmission. When the random backoff period is applied, multiple STAs are expected to attempt frame transmission after waiting different periods of time, and thus collision can be minimized.

The IEEE 802.11 MAC protocol provides a HCF (Hybrid Coordination Function). The HCF is based on the DCF and a PCF (Point Coordination Function). The PCF refers to a polling based synchronous access method of periodically polling all reception APs and/or STAs such that all reception APs and/or STAs can receive data frames. In addition, the HCF has EDCA (Enhanced Distributed Channel Access) and HCCA (HCF Controlled Channel Access). EDCA corresponds to a contention-based access scheme in which a provider provides data frames to a plurality of users, and HCCA uses a non-contention-based channel access scheme using a polling mechanism. Furthermore, the HCF includes a medium access mechanism for improving QoS (Quality of Service) of WLAN and can transmit QoS data in both a contention period (CP) and a contention-free period (CFP).

Figure 6:
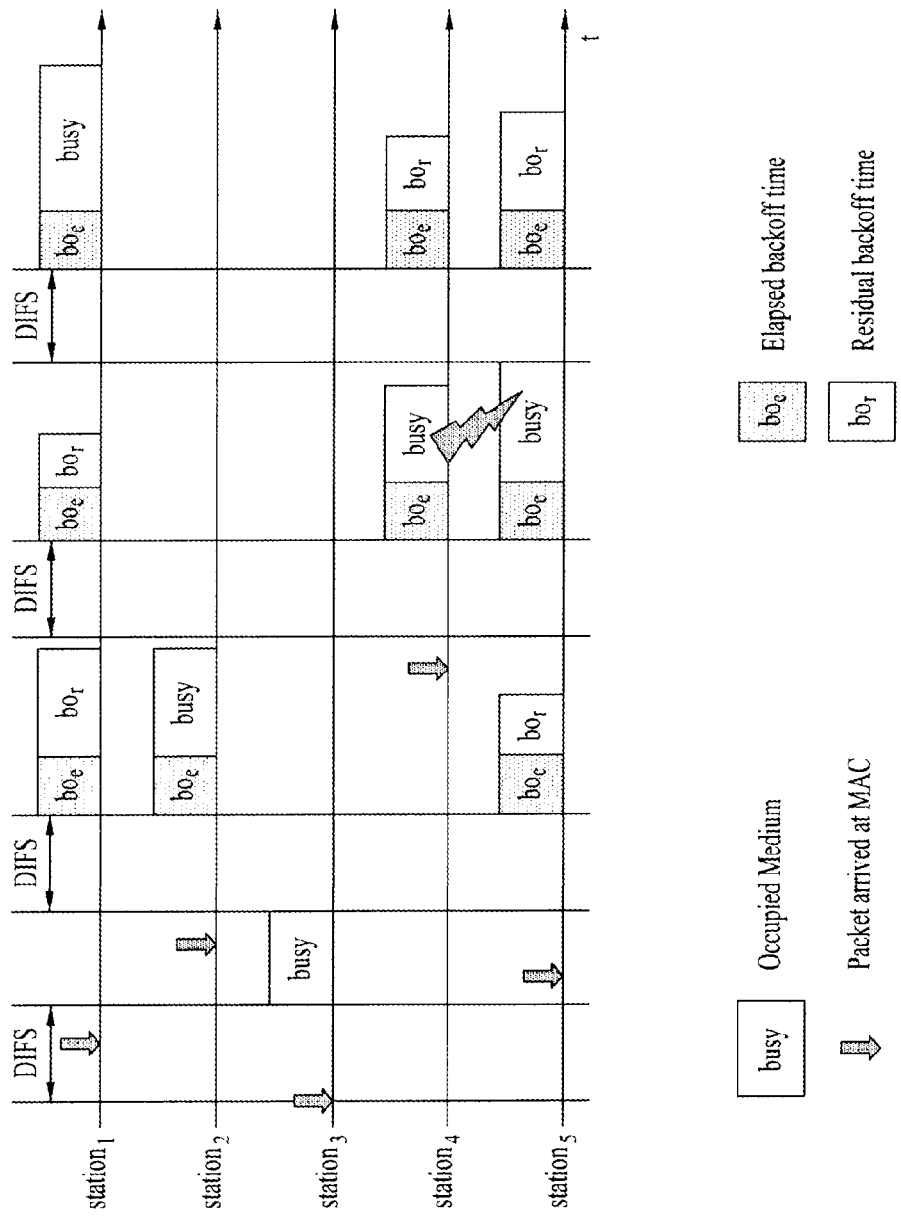
FIG. 6 illustrates a backoff procedure.

FIG. 6 illustrates a backoff procedure.

A description will be given of an operation based on a random backoff period with reference to FIG. 6. When a medium in an occupied or busy state enters an idle state, STAs may attempt data (or frame) transmission. In this case, the STAs may respectively select random backoff counts, wait slot periods corresponding to the random backoff counts, and then attempt transmission in order to minimize collision. A random backoff count has a pseudo-random integer value and may be determined as one of values in the range of 0 to CW. Here, CW is a contention window parameter. The CW parameter has an initial value CWmin and this value may be doubled in the case of transmission failure (e.g. when ACK for a transmitted frame is not received). When the CW parameter reaches CWmax, it is possible to attempt data transmission while maintaining CWmax until data transmission is successfully performed. CWmax is reset to CWmin upon successful data transmission. CW, CWmin and CWmax are preferably set to $2^n-1$ (n=0, 1, 2, ... ).

When a random backoff procedure is started, an STA continuously monitors the medium during backoff slot countdown according to the determined backoff count value. The STA stops countdown and waits when monitoring the medium in an occupied state and resumes remaining countdown when the medium enters an idle state.

In the example of FIG. 6, upon arrival of a packet to be transmitted at MAC of STA3, STA3 may confirm that the medium is in the idle state for DIFS and immediately transmit a frame. The remaining STAs monitor the medium in the busy state and wait. Data to be transmitted may be generated in STA1, STA2 and STA3 during monitoring and waiting. In this case, each STA can wait DIFS upon monitoring the medium in the idle state and then countdown backoff slots according to a random backoff count value selected thereby. In the example of FIG. 6, STA2 selects a smallest backoff count value and STA1 selects a largest backoff count value. That is, when STA2 finishes backoff count and starts frame transmission, residual backoff time of STA5 is shorter than residual backoff time of STA1. STA1 and STA5 stop countdown and wait while STA2 occupies the medium. When occupation of the medium of STA2 is ended and the medium becomes idle status, STA1 and STA5 resumes backoff count after waiting DIFS. That is, STA1 and STA5 can start frame transmission after countdown of residual backoff slots corresponding to residual backoff time. STA5 starts frame transmission since residual backoff time of STA5 is shorter than that of STA1. Data to be transmitted may be generated in STA4 while STA2 occupies the medium. When the medium becomes idle state, STA4 may wait DIFS, perform countdown according to the random backoff count value selected thereby and start frame transmission. FIG. 6 shows a case in which residual backoff time of STA5 is accidently consistent with the random backoff count value of STA4. In this case, STA4 and STA5 may collide. When collision occurs, both STA4 and STA5 cannot receive ACK and thus fail in data transmission. Here, STA4 and STA5 can double CW, select random backoff count values and perform countdown. STA1 may stand by during a period in which the medium is occupied due to transmission of STA4 and STA5, wait DIFS when the medium becomes idle, and then start frame transmission after residual backoff time elapses.

Sensing Operation of STA

As described above, the CSMA/CA mechanism includes virtual carrier sensing in addition to physical carrier sensing through which an AP and/or an STA directly senses a medium. Virtual carrier sensing solves a problem that may be generated in medium access, such as a hidden node problem. For virtual carrier sensing, MAC of the WLAN system can use a network allocation vector (NAV). The NAV is a value by which an AP and/or an STA, which are using a medium or have permission to use the medium, indicate a remaining time until the medium becomes available to other APs and/or STAs. Accordingly, a value set as the NAV corresponds to a period in which the medium is scheduled to be used by an AP and/or an STA transmitting a corresponding frame, and an STA receiving the NAV value is prevented from accessing the medium during the corresponding period. For example, the NAV can be set according to a value of the "duration" field of a MAC header of a frame.

To reduce the likelihood of collision, a robust collision mechanism has been introduced. The robust collision mechanism will now be described with reference to FIGS. 7 and 8. It is assumed that an actual carrier sensing range corresponds to a transmission range for convenience of description although they may not correspond to each other.

FIG. 7 illustrates a hidden node and an exposed node.

FIG. 7(b) illustrates an exemplary hidden node and shows a case in which STA A and STA B communicate with each other and STA C has information to be transmitted. Specifically, STA C may determine that a medium is idle during carrier sensing prior to transmitting data to STA B although STA A is transmitting information to STA B. This is because STA C may not sense transmission of STA A in the position of STA C. In this case, STA B simultaneously receives information of STA A and STA C and thus collision occurs. Here, STA A can be regarded as a hidden node of STA C.

FIG. 7(b) illustrates an exemplary exposed node and shows a case in which STA B transmits data to STA A and STA C has information to be transmitted to STA D. In this case, STA C may determine that the medium is occupied due to transmission of STA B using carrier sensing. Accordingly, STA C needs to wait until the medium becomes idle since the medium occupied state is sensed even when STA C has information to be transmitted to STA D. However, transmission from STA C and transmission from STA B may not collide since STA A is located outside a transmission range of STA C. Accordingly, STA C unnecessarily waits until STA B stops transmission. Here, STA C can be regarded as an exposed node of STA B.

Figure 8:
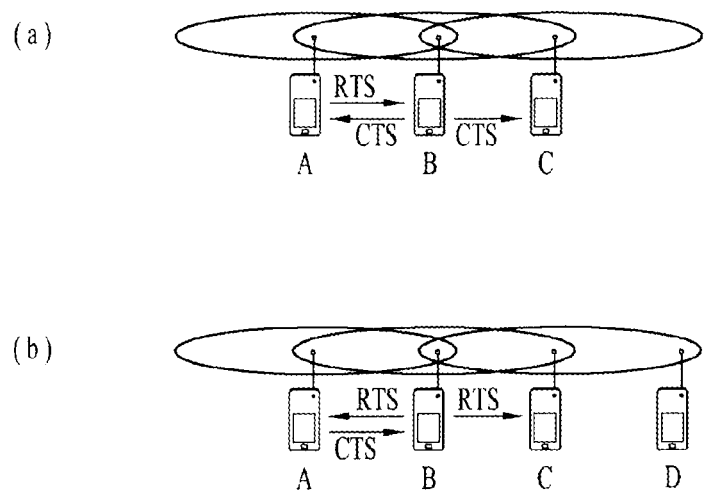
FIG. 8 illustrates RTS and CTS.

FIG. 8 illustrates RTS (Request to Send) and CTS (Clear to Send).

To efficiently use a collision avoidance mechanism in exemplary situations as shown in FIG. 7, a short signaling packet such as RTS and CTS can be used. RTS/CTS between two STAs may be used for neighboring STAs to take information transmission between the two STAs into account by overhearing the RTS/CTS. For example, when an STA intended to transmit data transmits an RTS frame to an STA that will receive the data, the STA receiving the data can notify neighboring STAs that the STA will receive the data by transmitting a CTS frame to the neighboring STAs.

FIG. 8(a) illustrates an exemplary method for solving a hidden node problem and shows a case in which both STA A and STA C attempt to transmit data to STA B. When STA A sends RTS to STA B, STA B transmits CTS to both STA A and STA C. Consequently, STA C waits until data transmission of STA A and STA B is finished and thus collision can be avoided.

FIG. 8(b) illustrates an exemplary method for solving an exposed node problem. STA C may determine that collision does not occur even when STA C transmits data to other STAs (e.g. STA D) by overhearing RTS/CTS transmission between STA A and STA B. Specifically, STA B transmits RTS to all neighboring STAs and transmits CTS only to STA A to which STA B will actually send data. STA C can recognize that STA A is located outside the carrier sensing range of STA C since STA C has received RTS but has not received CTS of STA A.

Power Management

STAs need to perform channel sensing prior to transmission/reception in a WLAN system, as described above. Continuous channel sensing causes continuous power consumption of STAs. Power consumption in a reception state is similar to power consumption in a transmission state, and thus maintenance of the reception state is a large burden on a power-restricted STA (i.e. a battery-powered STA). Accordingly, when an STA maintains a reception wait state to continuously sense channels, the STA inefficiently consumes power in terms of WLAN throughput. To solve this problem, WLAN systems support an STA power management (PM) mode.

The STA PM mode is classified into an active mode and a power save (PS) mode. STAs basically operate in the active mode. STAs operating in the active mode maintain an awake state. The awake state is a state in which normal operations such as frame transmission/reception, channel scanning and the like can be performed. An STA operating in the PS mode switches between a sleep state (or doze state)

and the awake state. An STA operating in the sleep state operates with minimum power and performs neither channel scanning nor frame transmission/reception.

When an STA operates in the sleep state for a long time, power consumption decreases and thus the operation period of the STA increases. However, an STA cannot unconditionally operate in the sleep state for a long time because frame transmission and reception cannot be performed in the sleep state. When an STA operating in the sleep state has a frame to be transmitted to an AP, the STA can switch to the awake state and transmit the frame. When the AP has a frame to be transmitted to the STA, the STA in the sleep state cannot receive the frame and cannot even recognize presence of the frame to receive. Accordingly, the STA may need to switch to the awake state at a specific interval in order to recognize presence of a frame to be transmitted thereto (or to receive the frame when the frame is present).

Figure 9:
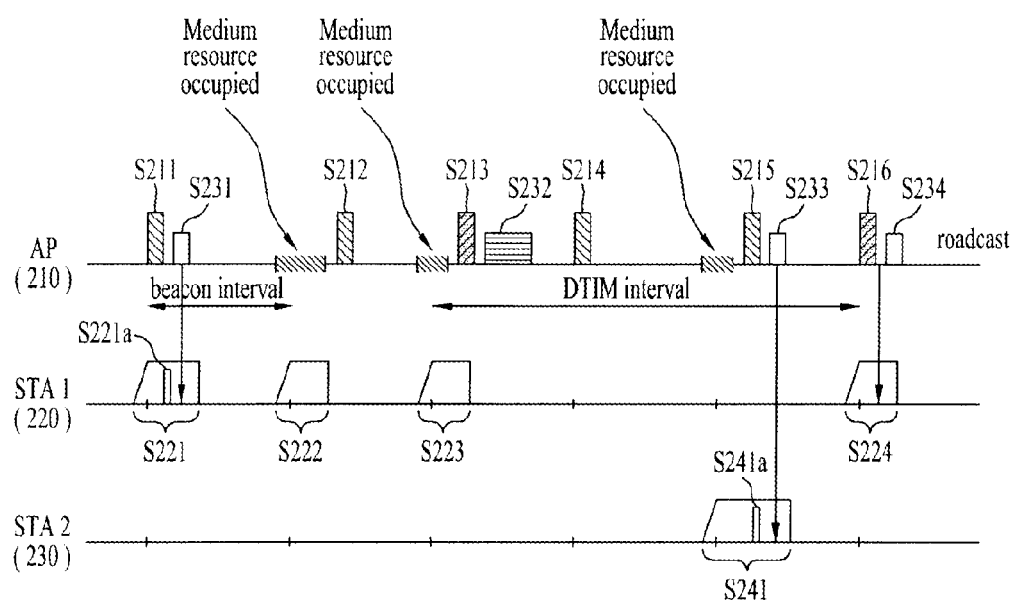
FIG. 9 illustrates power management operation.

FIG. 9 illustrates a power management operation.

Referring to FIG. 9, an AP 210 transmits a beacon frame to STAs in a BSS at a predetermined interval (S211, S212, S213, S214, S215 and S216). The beacon frame includes a TIM information element (IE). The TIM IE includes information indicating that buffered traffic for STAs associated with the AP 210 is present and the AP 210 will transmit a frame. A TIM element includes a TIM used to indicate a unicast frame and a delivery traffic indication map (DTIM) used to indicate a multicast or broadcast frame.

The AP 210 may transmit a DTIM for three beacon frame transmissions. STA1 220 and STA2 222 operate in the PS mode. STA1 220 and STA2 222 may be configured to switch from the sleep state to the awake state at a predetermined wakeup interval to receive a TIM element transmitted from the AP 210. Each STA may calculate a time to switch to the awake state on the basis of a local clock signal thereof. In the example of FIG. 9, it is assumed that an STA clock signal is consistent with an AP clock signal.

For example, the predetermined wakeup interval may be set such that STA1 220 switches to the awake state at a beacon interval to receive the TIM element. Accordingly, STA1 220 can switch to the awake state when the AP210 initially transmits the beacon frame (S211). STA1 220 can receive the beacon frame and obtain the TIM element. When the obtained TIM element indicates presence of a frame to be transmitted to STA1 220, STA1 220 may transmit a PS-poll frame for requesting frame transmission to the AP 210 (S221a). The AP 210 may transmit a frame to STA1 220 in response to the PS-poll frame (S231). Upon completion of frame reception, STA1 220 switches to the sleep state.

In second beacon frame transmission of the AP 210, beacon frame transmission of the AP 210 may be delayed since the AP 210 may not transmit the beacon frame at a correct beacon interval due to a busy medium state in which other devices access the medium (S212). In this case, STA1 220 switches to the awake state in synchronization with the beacon interval. However, STA1 220 returns to the sleep state since it cannot receive the delayed beacon frame (S222).

When the AP 210 transmits the third beacon frame, the beacon frame may include a TIM element set to a DTIM. However, the AP 210 delays beacon frame transmission because of the busy medium state (S213). STA1 220 may switch to the awake state in synchronization with the beacon interval and obtain the DTIM through the beacon frame transmitted from the AP 210. It is assumed that the DTIM obtained by STA1 220 indicates that there is no frame to be transmitted to STA1 220 and a frame for another STA is present. In this case, STA1 220 may confirm that there is no frame to receive and return to the sleep state. The AP 210 transmits the frame to the corresponding STA after transmitting the beacon frame (S232).

The AP 210 transmits the fourth beacon frame (S214). Since STA1 220 cannot obtain information indicating that buffered traffic therefor is present through reception of the TIM element twice, STA1 220 may adjust the wakeup interval for TIM element reception. Otherwise, when the beacon frame transmitted from the AP 210 includes signaling information for adjusting the wakeup interval of STA1 220, the wakeup interval of STA1 220 can be adjusted. In the example of FIG. 9, STA1 220 may be configured to switch operation mode such that STA1 220 wakes up every three beacon intervals instead of switching operation mode per beacon interval for TIM element reception. Accordingly, after the AP 210 transmits the fourth beacon frame (S214), STA1 220 cannot obtain the corresponding TIM element since STA1 220 maintains the sleep state when the AP 210 transmits the fifth beacon frame (S215).

When the AP 210 transmits the sixth beacon frame (S216), STA1 220 may switch to the awake state and obtain the TIM element included in the beacon frame (S224). Since the TIM element is a DTIM that indicates presence of a broadcast frame, STA1 220 may receive the broadcast frame transmitted from the AP 210 without transmitting a PS-poll frame to the AP 210 (S234). In the meantime, a longer wakeup interval than that of STA1 220 may be set for STA2 230. Accordingly, STA2 230 may switch to the awake state when the AP 210 transmits the fifth beacon frame (S215) to receive the TIM element (S241). STA2 230 may recognize that a frame to be transmitted thereto is present through the TIM element and transmit a PS-poll frame to the AP 210 to request frame transmission (S241a). The AP 210 may transmit the frame to STA2 230 in response to the PS-poll frame (S233).

For management of the power save mode, as shown in FIG. 9, the TIM element includes the TIM indicating presence of a frame to be transmitted to an STA or the DTIM indicating presence of a broadcast/multicast frame. The DTIM may be implemented by setting a field of the TIM element.

Figure 10:
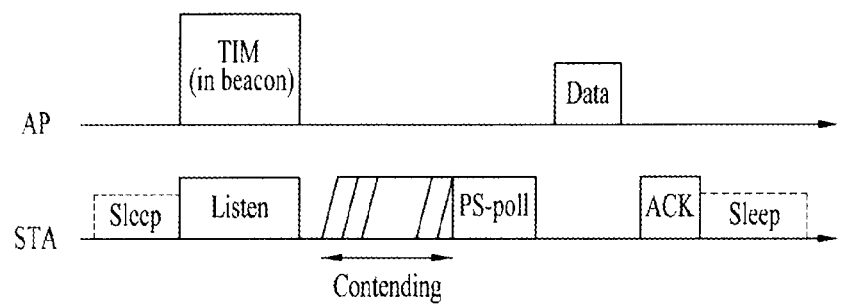
FIGS. 10 to 12 illustrate operation of an STA that has received a TIM.
Figure 11:
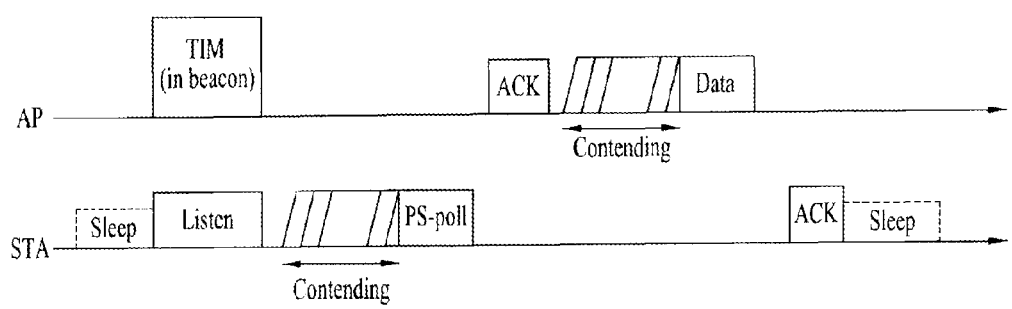
Figure 12:
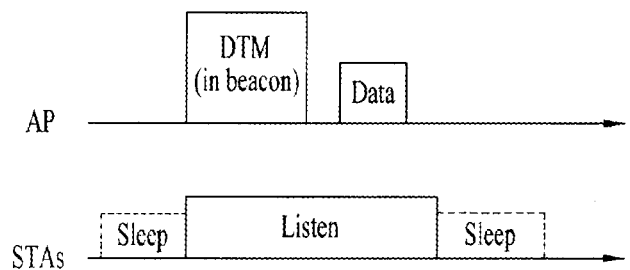

FIGS. 10 to 12 illustrate an operation of an STA receiving a TIM in detail.

Referring to FIG. 10, the STA may switch from sleep state to awake state in order to receive a beacon frame including the TIM from an AP and recognize presence of buffered traffic to be transmitted thereto by analyzing the received TIM element. The STA may transmit a PS-poll frame to the AP to request data frame transmission after contending with other STAs for medium access for PS-poll frame transmission. Upon reception of the PS-poll frame from the STA, the AP may transmit a data frame. The STA may receive the frame and transmit an ACK frame to the AP. Then, the STA may return to the sleep state.

As shown in FIG. 10, the AP may operate according to immediate response mode in which the AP transmits the data frame after the lapse of a predetermined time (e.g. short inter-frame space (SIFS)) from when the PS-poll frame is received from the STA. When the AP cannot prepare the data frame for SIFS after receiving the PS-poll frame, the AP may operate in a deferred response mode, which will now be described with reference to FIG. 11.

In the example of FIG. 11, the operation of the STA to switch from sleep state to awake state to receive a TIM from the AP and to transmit the PS-poll frame to the AP through contention is the same as the operation in the example of FIG. 10. When the AP cannot prepare the data frame for SIFS although the AP has received the PS-poll frame, the AP may transmit an ACK frame instead of the data frame to the STA. Upon preparation of the data frame after ACK frame transmission, the AP may transmit the data frame to the STA after contention. The STA may transmit an ACK frame indicating successful reception of the data frame to the AP and switch to the sleep state.

FIG. 12 illustrates an example in which the AP transmits a DTIM. STAs may switch from sleep state to awake state in order to receive a beacon frame including the DTIM from the AP. The STAs may be aware of transmission of a multicast/broadcast frame through the received DTIM. The AP may immediately transmit data (i.e. multicast/broadcast frame) without transmitting/receiving a PS-poll frame after transmitting the beacon frame including the DTIM. Upon reception of the beacon frame including the DTIM, the STAs may receive data in the awake state and return to the sleep state after completing data reception.

TIM Structure

In the method of managing the power save mode based on the TIM (DTIM) protocol, described with reference to FIGS. 9 to 12, an STA may check whether a data frame to be transmitted thereto is present through STA identification information included in the TIM element. The STA identification information may be information related to an association identifier (AID) allocated to the STA during association with the AP.

The AID is used as a unique identifier with respect to each STA in one BSS. For example, the AID can be allocated to one of values in the range of 1 to 2007 in the current WLAN system. In the current WLAN system, 14 bits may be allocated to a frame transmitted by an AP and/or an STA for the AID. While AID values may be allocated to up to 16383, 2008 to 16383 are set as reserved values.

The TIM element according to conventional definition is not appropriate for M2M applications in which a large number of (e.g. 2007 or more) STAs are associated with one AP. When the existing TIM structure is extended, a TIM bitmap size excessively increases and thus cannot be supported by existing frame formats. In addition, the extended TIM structure is not appropriate for M2M communication considering low transmission rate application. Furthermore, it is expected that the number of STAs having received data frames for one beacon interval is very small in M2M communication. Accordingly, considering application of M2M communication as described above, a technique of efficiently compressing a bitmap is needed since most bits have a value of 0 in many cases although the TIM bitmap size increases.

A method of omitting continuous 0s from the front part of a bitmap and defining the part as an offset (or start point) value has been provided as a bitmap compression technique. However, when there is a large difference between AID values of STAs while the number of STAs for which buffered frames are present is small, coding efficiency is not high. For example, when only frames to be transmitted to only two STAs respectively having AIDs of 10 and 2000 are buffered, all bits of the corresponding bitmap other than bits corresponding to both ends are 0 although the compressed bitmap has a length of 1990. While inefficiency of bitmap compression is insignificant when the number of STAs that can be associated with one AP is small, bitmap compression inefficiency may deteriorate system performance when the number of STAs increases.

To solve this, AIDs may be divided into groups and effective data transmission may be performed. A designated group ID (GID) is allocated to each group. AIDs allocated on a group basis will now be described with reference to FIG. 13.

FIG. 13(a) illustrates exemplary AIDs allocated on a group basis. In the example of FIG. 13(a), some first bits of the AID bitmap may be used to represent a GID. For example, 4 GIDs can be represented using first 2 bits of the AID bitmap. When the AID bitmap has a length of N bits, first 2 bits (B1 and B2) represent the GID of the corresponding AID.

FIG. 13(b) illustrates other exemplary AIDs allocated on a group basis. In the example of FIG. 13(b), a GID may be allocated depending on AID position. Here, AIDs using the same GID may be represented by an offset and a length. For example, when GID 1 is represented by offset A and length B, AIDs A to A+B−1 correspond to GID 1 in the bitmap. In the example of FIG. 13(b), it is assumed that 1 to N4, AIDs are divided into 4 groups. In this case, AIDs corresponding to GID 1 are 1 to N1, and may be represented by offset 1 and length N1. AIDs corresponding to GID 2 may be represented by offset N1+1 and length N2−, N1+1, AIDs corresponding to GID 3 may be represented by offset N2+1 and length N3−, N2+1 and AIDs corresponding to GID 4 may be represented by offset N3+1 and length N4−, N3+1.

AIDs allocated on a group basis permit channel access in different intervals according to GID to solve TIM element shortages for a large number of STAs and achieve efficient data transmission and reception. For example, channel access can be permitted for only STAs corresponding to a specific group and restricted for other STAs in a specific interval. A predetermined interval in which channel access is permitted for only specific STAs may be referred to as a restricted access window (RAW).

Channel access according to GID will now be described with reference to FIG. 13(c). FIG. 13(c) illustrates a channel access mechanism according to beacon interval when AIDs are divided into 3 groups. In the first beacon interval (or first RAW), channel access of STAs corresponding to AIDs belonging to GID 1 is permitted and channel access of STAs corresponding to other GIDs is not permitted. To implement this, the first beacon includes a TIM element only for AIDs corresponding to GID 1. The second beacon includes a TIM element only for AIDs corresponding to GID 2 and thus only channel access of STAs corresponding to AIDs belonging to GID 2 is permitted in the second beacon interval (or second RAW). The third beacon includes a TIM element only for AIDs corresponding to GID 3 and thus only channel access of STAs corresponding to AIDs belonging to GID 3 is permitted in the third beacon interval (or third RAW). The fourth beacon includes the TIM element only for the AIDs corresponding to GID 1 and thus only channel access of the STAs corresponding to the AIDs belonging to GID 1 is permitted in the fourth beacon interval (or fourth RAW). In the fifth and following beacon intervals (or fifth and following RAWs), only channel access of STAs belonging to specific groups indicated by TIMs included in the corresponding beacon frames is permitted.

While FIG. 13(c) illustrates GIDs in circular or periodic order according to beacon interval, the present invention is not limited thereto. That is, only AIDs corresponding to a specific GID may be included in a TIM element such that channel access of only STAs corresponding to the AIDs is permitted in a specific interval (e.g. specific RAW) and channel access of other STAs is restricted.

Figure 13:
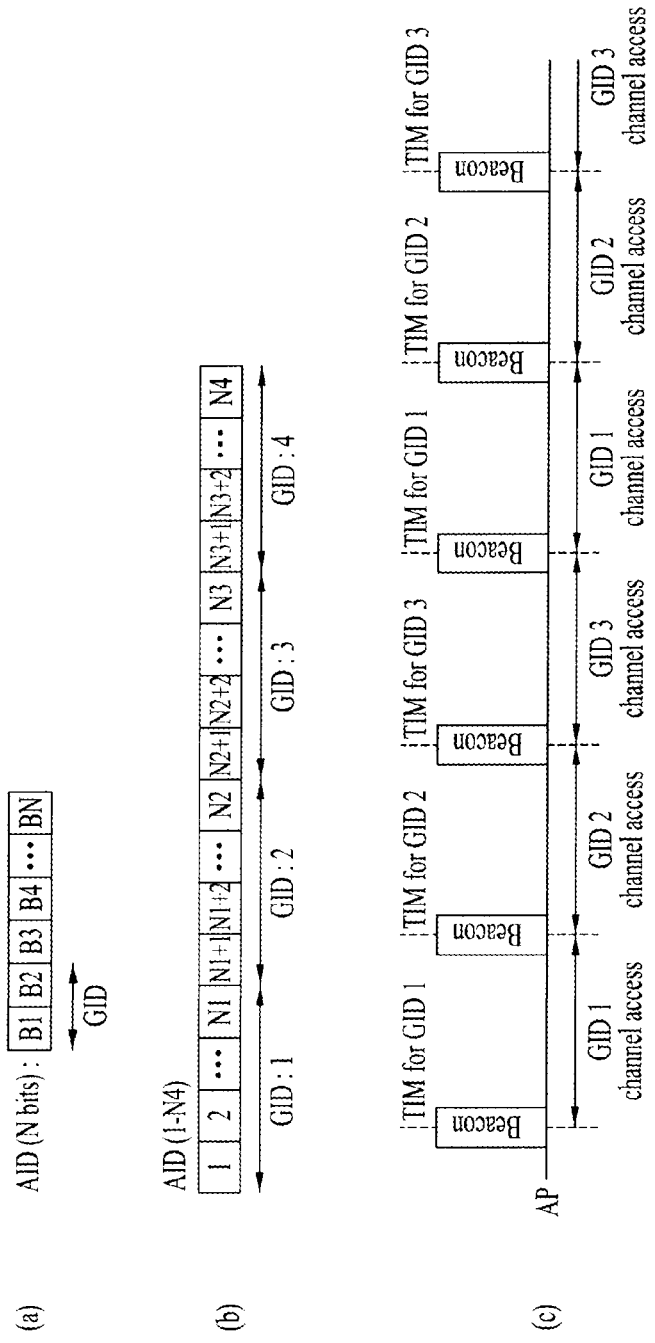
FIG. 13 illustrates group based AID.

The aforementioned group-based AID allocation scheme may be referred to as a hierarchical TIM structure. That is, all AIDs may be divided into a plurality of blocks and channel access of only STAs (i.e. STAs in a specific group) corresponding to a specific block having a non-zero value may be permitted. Accordingly, a large TIM is divided into small blocks/groups to allow STAs to easily maintain TIM information and to easily manage blocks/groups according to class, QoS or purpose of STA. While FIG. 13 illustrates a 2-level layer, a hierarchical TIM may be configured at two or more levels. For example, it is possible to divide all AIDs into a plurality of page groups, divide each page group into a plurality of blocks and divide each block into a plurality of sub-blocks. In this case, first N1, bits in an AID bitmap can represent a page ID (i.e. PID), the next N2, bits can represent a block ID, the next N3, bits can represent a sub-block ID and the remaining bits can represent an STA bit position in the corresponding sub-block, as an extension of the example of FIG. 13(a).

In embodiments of the present invention, which will be described below, various methods for dividing STAs (or AIDs respectively allocated to the STAs) into predetermined hierarchical groups and managing the divided STAs are applicable and group based AID allocation is not limited to the aforementioned examples.

PPDU Frame Format

A PPDU (Physical Layer Convergence Protocol (PLCP) Packet Data Unit) frame format may include a short training field (STF), a long training field (LTF), a signal (SIG) field and a data field. The most basic (e.g. non-HT (High Throughput)) PPDU frame format may be composed of L-STF (Legacy-STF), L-LTF (Legacy-LTF), an SIG field and a data field. In addition, STF, LTF and SIF fields may be added between the SIG field and the data field according to PPDU frame format type (e.g. HT-mixed format PPDU, HT-greenfield format PPDU, VHT (Very High Throughput) PPDU, etc.).

The STF is a signal for signal detection, AGC (Automatic Gain Control), diversity selection, accurate synchronization and the like and the LTF is a signal for channel estimation, frequency error estimation and the like. The STF and LTF may be referred to as a PCLP preamble which is a signal for synchronization of an OFDM physical layer and channel estimation.

The SIG field may include a RATE field and LENGTH field. The RATE field may include information about data modulation and coding rate. The LENGTH field may include information about a data length. In addition, the SIG field may include a parity bit, SIG TAIL bit and the like.

The data field may include a SERVICE field, PSDU (PLCP Service Data Unit) and PPDU TAIL bit and further include a padding bit as necessary. Some bits of the SERVICE field may be used for synchronization of a descrambler in a receiver. The PSDU corresponds to MAC PDU defined in MAC layer and may include data generated/used in a higher layer. The PPDU TAIL bit may be used to return an encoder to 0 state. The padding bit may be used to adjust a data field length to a predetermined unit.

The MAC PDU is defined according to various MAC frame formats. A basic MAC frame is composed of a MAC header, a frame body and an FCS (Frame Check Sequence). The MAC frame is composed of a MAC PDU and may be transmitted/received through a PSDI of a data part of the PPDU frame format.

A null-data packet (NDP) frame format refers to a frame format that does not include a data packet. That is, the NDP frame format means a frame format that includes only the PLCP header part (i.e. STF, LTF and SIG field) in the normal PPDU format and does not include a remaining part (i.e. data field). The NDP frame format may be referred to as a short frame format.

Short Beacon

A general beacon frame is composed of a MAC header, a frame body and an FCS and the frame body may include the following fields.

The timestamp field is for synchronization. All STAs that have received a beacon frame may change/update local clock signals thereof according to a timestamp value.

The beacon interval field indicates an interval between beacon transmissions and is represented in time unit (TU). The TU may be microseconds (μs). For example, the TU can be defined as 1024 μs. A time at which an AP needs to transmit a beacon may be represented as TBTT (Target Beacon Transmission Time). That is, the beacon interval field corresponds to an interval from a transmission time of one beacon frame to the next TBTT. An STA that has received a previous beacon may calculate a transmission time of the next beacon from the beacon interval field. In general, a beacon interval may be set to 100 TU.

The capability information field includes information about capability of a device/network. For example, the type of an adhoc or infrastructure network may be indicated through the capability information field. Furthermore, the capability information field may be used to indicate whether polling is supported, details of encoding and the like.

In addition, the beacon frame may include an SSID, supported rates, FH (Frequency Hopping) parameter set, DSSS (Direct Sequence Spread Spectrum) parameter set, CF (Contention Free) parameter set, IBSS parameter set, TIM, country IE, power constraint), QoS capability, HT (High-Throughput) capability, etc. However, the fields/information included in the beacon frame are exemplary and the beacon frame mentioned in the present invention is not limited thereto.

A short beacon frame different from the aforementioned normal beacon frame may be defined. To discriminate the normal beacon frame from the short beacon frame, the conventional beacon may be referred to as a full beacon.

Figure 14:
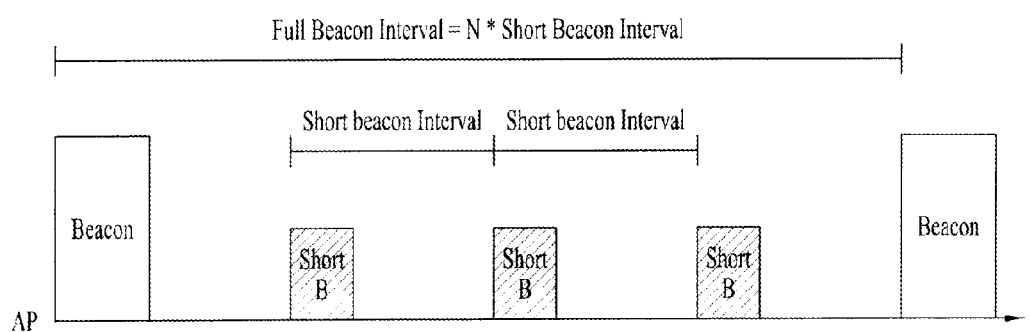
FIG. 14 illustrates a short beacon.

FIG. 14 illustrates the short beacon.

A short beacon interval is represented in TU and a beacon interval (i.e. a beacon interval of the full beacon) may be defined as an integer multiple of the short beacon interval. As shown in FIG. 14, the full beacon interval can be defined as N * short beacon interval (N≥1). For example, the short beacon can be transmitted one or more times during an interval between a time when one full beacon is transmitted and a time when the next full beacon is transmitted. FIG. 14 shows an example in which three short beacons (short Bs) are transmitted in the full beacon interval.

An STA may determine whether a desired network is available using an SSID (or compressed SSID) included in a short beacon. The STA may transmit an association request to a MAC address of an AP, included in the short beacon transmitted from the desired network. Since the short beacon is transmitted more frequently than the full beacon in general, an unassociated STA can rapidly associate with an AP by supporting the short beacon. When the STA needs additional information for association, the STA may transmit a probe request a desired AP. In addition, synchronization may be performed using timestamp information included in the short beacon. Furthermore, it is possible to indicate whether network information has been changed through the short beacon. When the network information has been changed, the STA may obtain the changed network information through the full beacon. The short beacon may include a TIM. That is, the TIM may be provided through the full beacon and the short beacon.

FIG. 15 illustrates exemplary fields included in a short beacon frame.

The FC (Frame Control) field may include a type/subtype field and may indicate that the short beacon frame corresponds to a short beacon. The FC field may have a length of 2 octets.

The SA (Source Address) field may be a MAC address of an AP that transmits the short beacon. The SA field may have a length of 6 octets.

The compressed SSID field may include part of the SSID of a network or a hashing value of the SSID. An STA that already knows the corresponding network may be allowed to discover the network using the SSID. The length of the compressed SSID field has not been determined yet and is to be determined The timestamp field may include 4 bytes of LSBs (Least Significant Bits) of a timestamp of an AP. Even when only 4 bytes of LSBs instead of the entire timestamp are provided, an STA (e.g. an associated STA) that has ever received the entire timestamp can perform synchronization using the 4 bytes of LSBs.

The change sequence field may include information that indicates whether network information has been changed. Specifically, when important information (e.g. beacon information) of a network is changed, a change sequence counter increases by 1. The change sequence field has a length of 1 octet.

The duration to next full beacon field may be included in a short beacon or not. This field can indicate, to the STA, an interval from transmission time of the short beacon to transmission time of the next full beacon. Accordingly, upon hearing the short beacon, the STA may operate in the doze (or sleep) mode to reduce power consumption. The length of this field is to be determined.

The short beacon frame may include additional or optional fields or information elements (IEs) in addition to the aforementioned exemplary fields.

The CRC (Cyclic Redundancy Check) field may be used to check whether the short beacon frame has an error.

Method for Obtaining Network Information through Probe Request/response

As described in the aforementioned active scanning, an STA may identify/discover a network by transmitting a probe request frame to an AP and receiving a probe response frame from the AP.

Specifically, an STA having a measurement request type set to an active mode may transmit the probe request frame on a requested channel at the start of a measurement duration. In response to the probe request frame, an AP may provide a confirmation response to the STA using a probe response frame. Through this probe request/response procedure, the STA may obtain, from the AP, time synchronization information, beacon reception information, network related identification information (e.g. SSID), capability information, basic information for data transmission and reception in a corresponding network, etc. For example, the probe response frame may include information similar to information included in the beacon frame, such as timestamp, beacon interval, capability, SSID, supported rates, FH parameter set, DSSS parameter set, CF parameter set, IBSS parameter set, country, power constraint field, etc. Since the probe response frame includes timestamp information and beacon interval information, an STA that has ever received a beacon can predict the next beacon transmission time from the beacon interval information.

However, since the probe response frame includes only the beacon interval information, an STA that has never received an initial beacon cannot correctly calculate a time at which the next beacon can be received only using the beacon interval information. Furthermore, even when the STA attempts to predict the next beacon reception time from the timestamp information and beacon interval information, if the beacon interval has been changed only once after the initial beacon transmission time, then a predicted value may not be correct. For example, an STA in initial status cannot be aware of a correct time at which a beacon signal can be received even if the STA receives a probe response frame, and thus the STA needs to wait while continuously listening to channels until a beacon is transmitted. That is, when the STA has not been synchronized with a network (or AP), the STA cannot operate in power save mode (e.g. doze state) since the STA cannot be aware of a correct time when the STA can listen to a beacon frame.

As described above, since the STA that has performed the probe request/response procedure cannot determine/calculate a time at which the next beacon frame can be received, the STA cannot operate in the power save mode, thereby increasing power consumption thereof. Particularly, when an STA having power consumption restriction or an STA operating in the doze (or sleep) mode at a long interval consumes power in order to receive a beacon, a duration in which the STA can perform correct operation expected therefor may be remarkably reduced.

The present invention suggests a new operation (particularly, new signaling defined in the probe request/response procedure) for solving the aforementioned problem and enabling an STA to efficiently receive a beacon to rapidly obtain network information while decreasing power consumption. In regard to this, since a beacon can be defined as a full beacon or a short beacon, as described above, the suggestion of the present invention includes a detailed scheme in consideration of beacon type.

Embodiment 1

The present embodiment relates to a method of enabling an STA to receive a full beacon by signaling information about the next full beacon to the STA.

Figure 16:
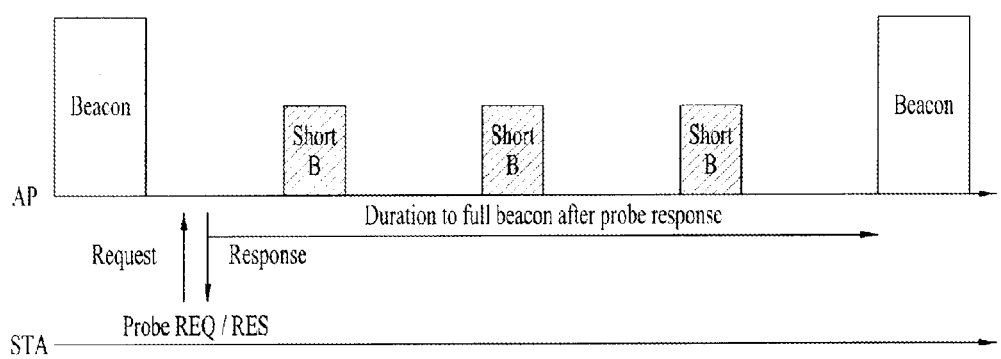
FIG. 16 illustrates a method for providing beacon reception information according to an embodiment of the present invention.

FIG. 16 illustrates a method of providing beacon reception information according to an embodiment of the present invention.

An AP may transmit, to an STA, a probe response frame in response to a probe request frame transmitted from the STA. According to the present invention, information about the next full beacon, which is included in the probe response frame, may be information about a time taken to receive the next full beacon or target beacon transmission time (TBTT) with respect to the next full beacon. For example, the information about a duration to the next full beacon may be included in the probe response frame as the duration to next full beacon field. Information about a duration from when the STA receives the probe response frame to when the STA receives the next full beacon or information about a difference (i.e. time offset) between the probe response frame reception time and the next full beacon reception time may be included in the probe response frame and transmitted. Information about target beacon transmission time for the next full beacon may be included in the probe response frame as the next TBTT field. The next TBTT field indicates TBTT with respect to the next full beacon of the AP that transmits the probe response frame.

Upon reception of the probe response frame, the STA may determine/calculate a time at which the next full beacon can be received on the basis of current probe response frame reception time using the value of the duration to next full beacon field. In addition, the STA may calculate transmission time of the next full beacon on the basis of a timestamp value included in the probe response frame and the next TBTT. Accordingly, the STA can correctly receive the next full beacon.

The STA may operate in the power save mode (e.g. doze mode) until the next full beacon frame is received after reception of the probe response frame and wake up at the transmission time of the next full beacon frame (e.g. immediately before the full beacon frame transmission time) to receive a full beacon.

Here, the AP may set the duration to next full beacon field in consideration of a time (i.e. processing delay) required for the STA to successfully receive and decode the probe response frame and inform the STA of the set duration to next full beacon field. That is, since the STA can check the value of the duration to next full beacon field or next TBTT field upon reception and decoding of the probe response frame, the AP may inform the STA of a duration from when the STA checks the value to when the next beacon frame is received to reduce processing overhead of the STA.

Embodiment 2

The present embodiment relates to a method for enabling an STA to receive a full beacon by signaling, to the STA, information about a duration to the next short beacon and information about a duration from a short beacon to a full beacon. This method corresponds to an exemplary hierarchical beacon reception method suggested by the present invention.

Figure 17:
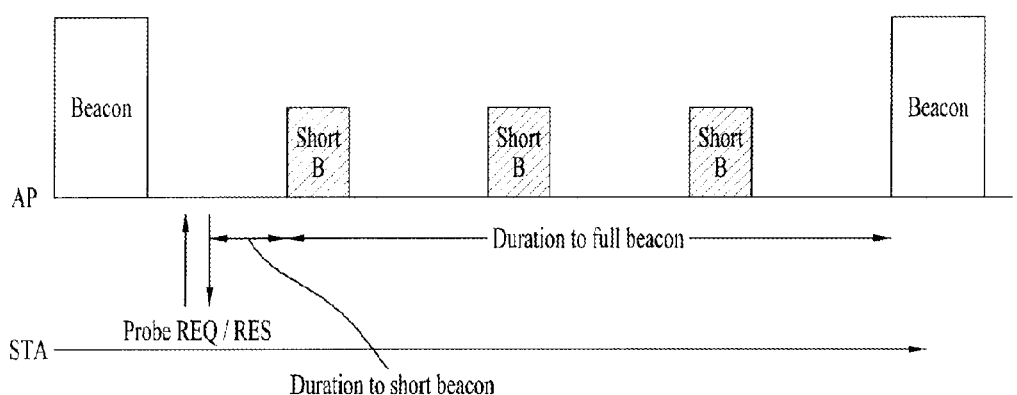
FIG. 17 illustrates a method for providing beacon reception information according to another embodiment of the present invention.

FIG. 17 illustrates a method of providing beacon reception information according to an embodiment of the present invention.

The AP may transmit, to the STA, a probe response frame in response to a probe request frame transmitted by the STA. According to the present invention, in a system supporting short beacon transmission and reception, information about a duration from when the STA receives the probe response frame to when the STA receives the next short beacon or information about a difference (i.e. time offset) between the probe response frame reception time and a next short beacon reception time may be included in the probe response frame and transmitted. For example, the duration to next short beacon field can be included in the probe response frame.

Upon reception of the probe response frame, the STA may determine/calculate a time at which the STA can receive the next short beacon on the basis of reception time of the current probe response frame using the value of the duration to next short beacon field. Accordingly, the STA can correctly receive the next short beacon.

Upon reception of the short beacon, the STA may determine/calculate a time at which the STA can receive the next full beacon on the basis of the value of the duration to next full beacon field or next TBTT field when the short beacon includes the duration to next full beacon field or next TBTT field. Accordingly, the STA can correctly receive the next full beacon.

That is, the STA may determine a time when the STA can receive a short beacon using information included in the probe response frame, receive the short beacon, and determine a time when the STA can receive a full beacon using information included in the short beacon to finally receive the full beacon.

In addition, the STA may operate in the power save mode (e.g. doze mode) in a duration to the next short beacon frame after reception of the probe response frame and wake up at transmission time of the next short beacon frame (e.g. immediately before the short beacon frame transmission time) to receive the short beacon frame. Furthermore, the STA may operate in the power save mode (e.g. doze mode) in a duration to the next full beacon frame after reception of the short beacon frame and wake up at transmission time of the next full beacon frame (e.g. immediately before the full beacon frame transmission time) to receive the full beacon frame.

Embodiment 3

The present embodiment relates to a method of enabling an STA to receive a full beacon by signaling, to the STA, information about a duration to the next short beacon and short beacon related information. This method corresponds to another exemplary hierarchical beacon reception method suggested by the present invention.

Figure 18:
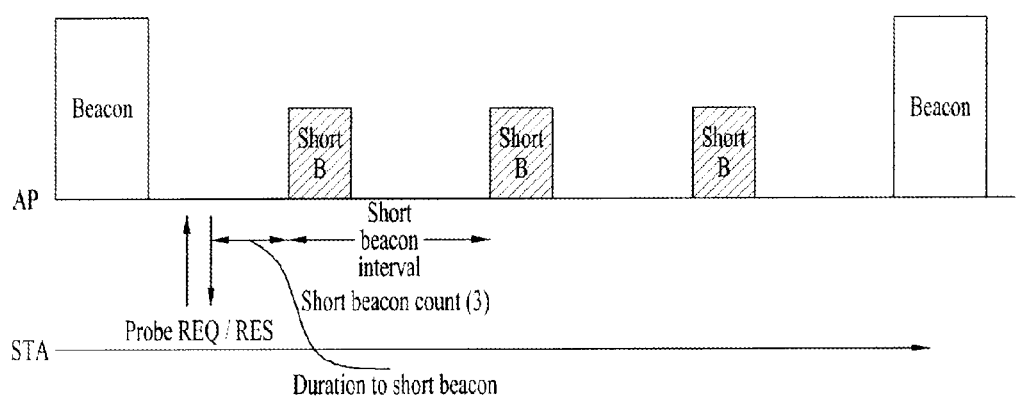
FIG. 18 illustrates a method for providing beacon reception information according to another embodiment of the present invention.

FIG. 18 illustrates a method of providing beacon reception information according to another embodiment of the present invention.

The AP may transmit, to the STA, a probe response frame in response to a probe request frame transmitted by the STA. According to the present invention, in a system supporting short beacon transmission and reception, information about a duration from when the STA receives the probe response frame to when the STA receives the next short beacon or information about a difference (i.e. time offset) between the probe response frame reception time and a next short beacon reception time may be included in the probe response frame and transmitted. For example, the duration to next short beacon field can be included in the probe response frame.

In addition, the probe response frame may further include short beacon count information of the next short beacon. The short beacon count information may correspond to the number of short beacon frames that remain before the next full beacon frame transmission time, including the next short beacon frame. Otherwise, the short beacon count information may indicate the number of remaining short beacon frames, except for the next short beacon frame, which can be transmitted before the next full beacon frame transmission time. The short beacon count information may be included in the short beacon frame instead of the probe response frame.

The probe response frame may additionally include short beacon interval information. A short beacon interval refers to a duration between short beacon frames.

Upon reception of the probe response frame, the STA may determine/calculate a time at which the STA can receive the next short beacon on the basis of reception time of the current probe response frame using the value of the duration to next short beacon field. Accordingly, the STA can correctly receive the next short beacon. Here, the STA may operate in the power save mode (e.g. doze mode) in a duration to the next short beacon frame after reception of the probe response frame and wake up at transmission time of the next short beacon frame (e.g. immediately before the short beacon frame transmission time) to receive the short beacon frame.

Upon reception of short beacons, as described above, the STA may determine/calculate a duration to the next full beacon transmission time using the short beacon count information and the short beacon interval information included in the probe response frame (or short beacon frame).

In the example of FIG. 18, the short beacon count value is set to 3, which means that the number of remaining short beacon frames including the next short beacon frame before the next full beacon reception time is 3. (Otherwise, the short beacon count value may be set to 2 according to the count scheme in which the number or remaining short beacon frames does not include the next short beacon frame, and thus the different numbers of remaining short beacon frames represent the same situation.) In this case, the STA may determine that the next full beacon frame is to be received after "duration to next short beacon"+3* short beacon interval on the basis of the probe response frame reception time.

Particularly, when the full beacon interval corresponds to an integer multiple of the short beacon interval, the operation of the present embodiment can be advantageously applied.

Accordingly, the STA can correctly receive the next full beacon. Here, the STA may operate in the power save mode (e.g. doze mode) in a duration to the next full beacon frame after reception of the short beacon frame and wake up at transmission time of the next full beacon frame (e.g. immediately before the full beacon frame transmission time) to receive the full beacon.

Embodiment 4

The present invention relates to a method of enabling an STA to receive a full beacon by signaling, to the STA, information about a duration to the next short beacon and short beacon configuration information. This method corresponds to another exemplary hierarchical beacon reception method suggested by the present invention.

The short beacon configuration information may include at least one of the number of short beacons, short beacon interval and short beacon index information.

The number of short beacons refers to the number of short beacon frames transmitted between full beacons (i.e. during the full beacon interval). This information may be included in the probe response frame and provided to the STA, included in a short beacon frame and provided to the STA or determined using a predetermined value in the system without signaling.

The short beacon interval refers to a duration between short beacons. This information may be included in the probe response frame and provided to the STA or included in a short beacon frame and provided to the STA.

Short beacon indices may be provided as sequentially increasing values indicating respective short beacons and respectively allocated to short beacons. While it is assumed that the short beacon index starts from 1 in the present invention, the principle of the present invention can be equally applied when the short beacon index starts from 0. The short beacon index information may be included in the probe response frame and provided to the STA or included in a short beacon frame and provided to the STA.

Figure 19:
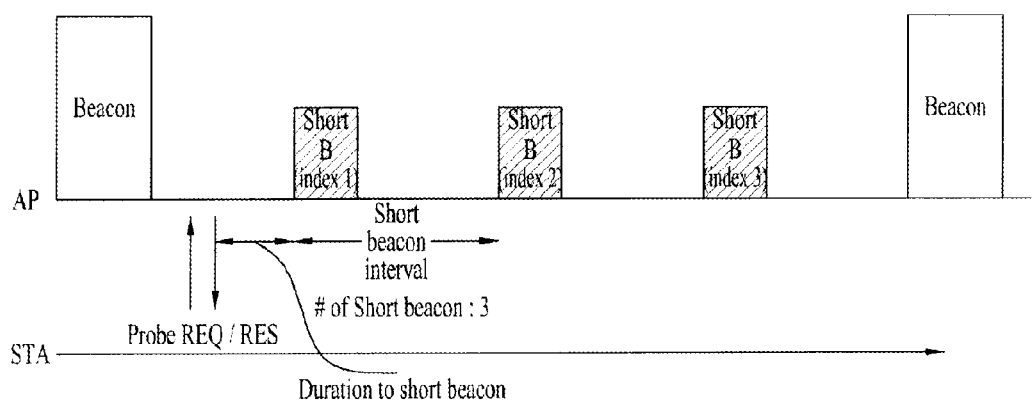
FIG. 19 illustrates a method for providing beacon reception information according to another embodiment of the present invention.

FIG. 19 illustrates a method of providing beacon reception information according to another embodiment of the present invention.

The AP may transmit, to the STA, the probe response frame in response to the probe request frame transmitted by the STA. According to the present invention, in a system supporting short beacon transmission and reception, information about a duration from when the STA receives the probe response frame to when the STA receives the next short beacon or information about a difference (i.e. time offset) between the probe response frame reception time and a next short beacon reception time may be included in the probe response frame and transmitted. For example, the duration to next short beacon field can be included in the probe response frame.

Upon reception of the probe response frame, the STA may determine/calculate a time at which the STA can receive the next short beacon on the basis of reception time of the current probe response frame using the value of the duration to next short beacon field. Accordingly, the STA can correctly receive the next short beacon. Here, the STA may operate in the power save mode (e.g. doze mode) in a duration to the next short beacon frame after reception of the probe response frame and wake up at transmission time of the next short beacon frame (e.g. immediately before the short beacon frame transmission time) to receive the short beacon frame.

Upon reception of the short beacon as described above, the STA may obtain short beacon index information of the corresponding short beacon frame. Accordingly, the STA can recognize how many short beacon frames are present before the received short beacon frame. In addition, the STA may determine/calculate a time when the next full beacon frame can be received using the information about the number of short beacons and the short beacon interval provided through the probe response frame.

In the example of FIG. 19, it is assumed that the number of short beacon frames corresponding to the full beacon interval is 3 and the index of the short beacon frame initially received by the STA is 1 on the basis of the duration to next short beacon included in the probe response frame. In this case, the STA can recognize that the next full beacon frame is to be transmitted after transmission of two more short beacons except for the already received short beacon. Accordingly, the STA can calculate the next full beacon transmission time as a time after 3 short intervals from the current time when the short beacon (i.e. short beacon #1) is received.

Particularly, when the full beacon interval corresponds to an integer multiple of the short beacon interval, the operation of the present embodiment can be advantageously applied.

Accordingly, the STA can correctly receive the next full beacon. Here, the STA may operate in the power save mode (e.g. doze mode) in a duration to the next full beacon frame after reception of the short beacon frame and wake up at transmission time of the next full beacon frame (e.g. immediately before the full beacon frame transmission time) to receive the full beacon.

In the aforementioned embodiments of the present invention, while the duration to next short beacon information can be included in the probe response frame, additional information may be defined as being included in the short beacon frame. For example, the short beacon related information (e.g. the short beacon count information, short beacon interval information, etc.) in embodiment 2 and the short beacon configuration information (e.g. the number of short beacons, short beacon interval information, short beacon index, etc.) in embodiment 3 may be directly included in the corresponding short beacon instead of the probe response frame. In this case, the STA can correctly receive the next short beacon using the duration to next short beacon information included in the probe response frame while operating in the power save mode. In addition, the STA can correctly receive the next full beacon frame using additional information (e.g. at least one of short beacon count information, short beacon interval information, the number of short beacons and short beacon index information) included in the short beacon frame while operating in the power save mode.

An STA of a specific type may be defined to operate using only a short beacon signal (or by receiving only the short beacon signal) without using a full beacon (or without listening to the full beacon). For the STA of this type, the AP may inform the STA of a duration to the next short beacon through the probe response frame. Otherwise, the AP may inform the STA of the duration to the next short beacon and short beacon interval information through the probe response frame.

Figure 20:
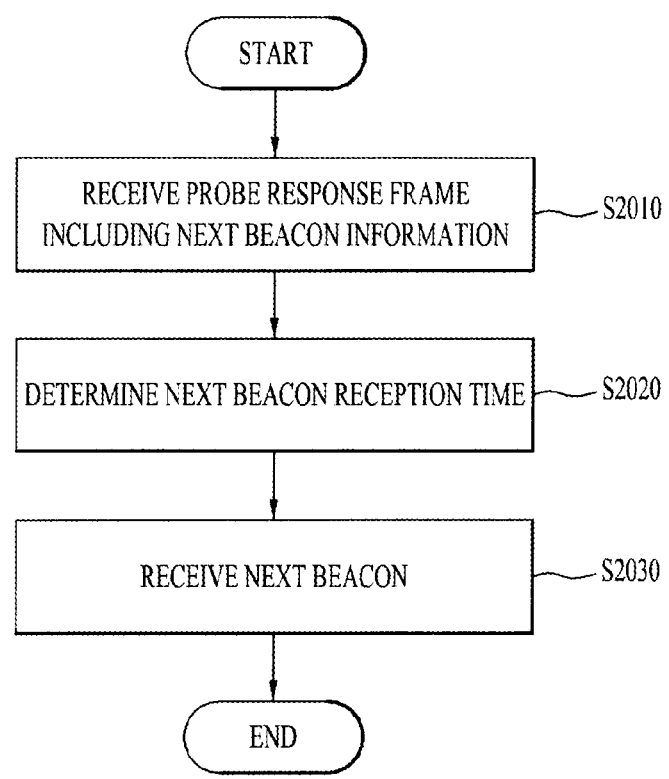
FIG. 20 illustrates a method for transmitting/receiving a beacon frame according to an embodiment of the present invention.

FIG. 20 is a flowchart illustrating a method for transmitting/receiving a beacon frame according to an embodiment of the present invention.

An STA may receive a probe response frame from an AP in step S2010. The probe response frame may be received as a response to a probe request frame (not shown) transmitted from the STA to the AP. The probe response frame may include information on the next beacon of the AP.

The STA may determine a time when the next beacon can be received using the received information on the next beacon in step S2020.

The STA may receive the next beacon at the determined time in step S2030.

The STA may operate in the power save mode (e.g. doze state) between steps S2020 and S2030, which is not shown in FIG. 20.

When the next beacon is a full beacon in the example of FIG. 20, the STA may receive the probe response frame to determine a reception time of the next full beacon, switch to a doze state and then switch to an awake state immediately before receiving the next full beacon to receive the full beacon. The next beacon information of the AP, included in the probe response frame, may be a duration to the next beacon or next TBTT information.

When the next beacon is a short beacon in the example of FIG. 20, the STA may receive the probe response frame to determine the next short beacon reception time, switches to a doze state and then switches to an awake state immediately before receiving the next short beacon to receive the short beacon.

Here, when the STA that has received the short beacon needs to receive the full beacon, the STA can determine a reception time of the next full beacon using various types of information included in the short beacon (or the probe response frame) (not shown). The various types of information may basically include the duration to the next full beacon, described in the embodiments of the present invention, and may additionally include at least one of the short beacon count information, short beacon interval information, the number of short beacons, and short beacon index information. The STA may receive the short beacon frame to determine a reception time of the next full beacon, switch to a doze state and then switch to an awake state immediately before receiving the next full beacon to receive the full beacon (not shown).

The method of receiving a beacon according to the present invention, illustrated in FIG. 20, may be implemented such that the aforementioned embodiments of the present invention are independently applied or two or more thereof are simultaneously applied.

Figure 21:
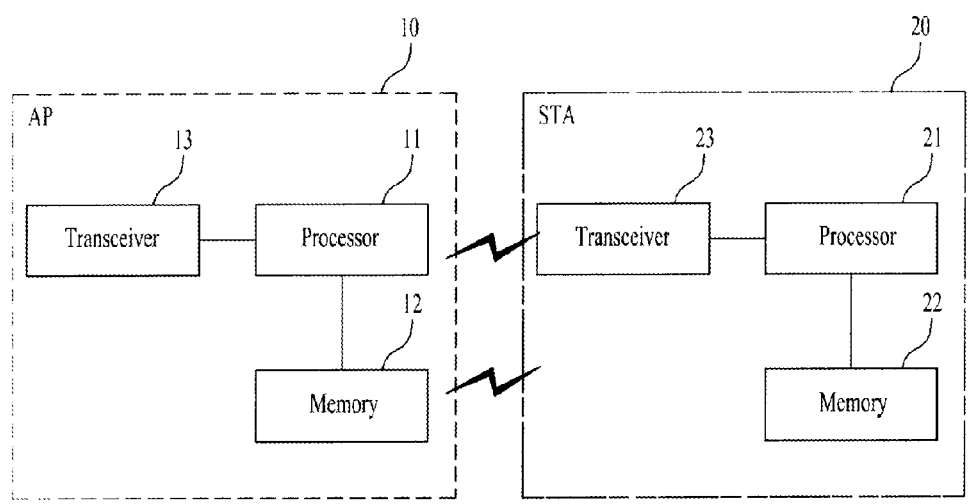
FIG. 21 is a block diagram illustrating a configuration of an RF device according to an embodiment of the present invention.

FIG. 21 is a block diagram illustrating a configuration of an RF device according to an embodiment of the present invention.

An AP 10 may include a processor 11, a memory 12 and a transceiver 13. An STA 20 may include a processor 21, a memory 22 and a transceiver 23. The transceivers 13 and 23 may transmit/receive RF signals and implement a physical layer according to IEEE 802, for example. The processors 11 and 21 may be connected to the transceivers 13 and 23 and implement a physical layer and/or MAC layer according to IEEE 802. The processor may be configured to perform operations according to the aforementioned embodiments of the present invention. Modules for implementing operations of the AP and the STA according to the aforementioned embodiments of the present invention may be stored in the memories 12 and 22 and executed by the processors 11 and 21. The memories 12 and 22 may be included in the processors 11 and 21 or provided to the outside of the processors 11 and 21 and connected to the processors 11 and 21 through a known means.

Detailed configurations of the aforementioned AP and STA may be implemented such that the aforementioned embodiments of the present invention can be independently applied or two or more thereof can be simultaneously applied and description of redundant parts are omitted is omitted clarity.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method for receiving a beacon by a station (STA) in a wireless communication system, the method comprising:
   transmitting a first frame to an access point (AP);
   receiving, from the AP, a second frame in response to transmitting the first frame;
   determining a beacon reception time using a duration to a next target beacon transmission time (TBTT) included in the second frame, wherein the duration corresponds to a time duration from reception of the second frame to reception of the next target beacon and wherein the duration is configured by the AP when the first frame is received from the STA; and
   receiving the beacon at the determined beacon reception time.

2. The method according to claim 1, wherein the STA switches to a doze state after determining the beacon reception time, and switches to an awake state before the determined beacon reception time ends.

3. The method according to claim 1, wherein the beacon is a full beacon.

4. The method according to claim 1, wherein the beacon is a short beacon.

5. The method according to claim 1, further comprising:
determining a full beacon reception time using a duration to a full beacon or next TBTT included in a received short beacon; and
receiving a full beacon at the determined full beacon reception time.

6. The method according to claim 5, wherein the STA switches to a doze state after determining the full beacon reception time, and switches to an awake state before the determined full beacon reception time ends.

7. The method according to claim 1, further comprising:
determining a full beacon reception time using at least one of short beacon count information or short beacon interval information; and
receiving a full beacon at the determined full beacon reception time.

8. The method according to claim 7, wherein the at least one of the short beacon count information or the short beacon interval information is included in the second frame or a short beacon.

9. The method according to claim 1, further comprising:
determining a full beacon reception time using at least one of short beacon number information, short beacon interval information, or short beacon index information; and
receiving a full beacon at the determined full beacon reception time.

10. The method according to claim 9, wherein the at least one of short beacon number information, short beacon interval information, or short beacon index information is included in the second frame or a short beacon.

11. The method according to claim 1, wherein the beacon is a short beacon, and wherein the short beacon includes at least one of a compressed service set identifier (SSID) field, a 4-byte timestamp, or a change sequence field.

12. The method according to claim 1, wherein the second frame includes at least one of a timestamp or an SSID.

13. A station (STA) for receiving a beacon in a wireless communication system, comprising:
a transceiver; and
a processor that:
controls the transceiver to transmit a first frame to an access point (AP),
controls the transceiver to receive, from the AP, a second frame in response to transmitting the first frame,
determines a beacon reception time using a duration to a next target beacon transmission time (TBTT) included in the second frame, wherein the duration corresponds to a time duration from reception of the second frame to reception of the next target beacon and wherein the duration is configured by the AP when the first frame is received from the STA, and
receives the beacon at the determined beacon reception time using the transceiver.

* * * * *